Patented Nov. 27, 1934

1,982,129

UNITED STATES PATENT OFFICE 1,982,129

PURIFICATION OF DEINKING WASTES AND OTHER INDUSTRIAL EFFLUENTS

Sidney D. Wells, Appleton, Wis., and William B. Cramer, Denver, Colo., assignors to Lewis L. Alsted, Appleton, Wis.

No Drawing. Application March 24, 1933, Serial No. 662,574

8 Claims. (Cl. 209—166)

Our invention relates generally to a method of recovering or removing ingredients from waste liquors of industrial operations and is particularly although not necessarily solely adapted for use in recovering the pigment and the retained fibers from the effluent or waste liquor of de-inking operations. Although the method is particularly advantageous in this respect it may also be used to advantage in connection with various other industrial operations. For example, it may be employed for removing the colloidal sulphur content from the waste liquor resulting from the production of illuminating gas or may be employed for recovering valuable by-products from and for rendering less objectionable, from the standpoint of stream pollution, the effluents or waste liquors resulting from the carbonizing of woolen rags containing cotton or other vegetable fibers, or from wool scouring operations, or the like.

In the recovery of paper pulp from waste printed paper it has been proposed to loosen the ink from the fibers by means of soaps or detergents which dissolve or emulsify the binder and attract and hold the pigment particles or else to subject certain types of ink to the action of a bleaching agent which destroys the color thereof. The effluent or waste liquor from such operations is generally objectionable from the standpoint of stream pollution. Furthermore, such waste liquor contains a certain amount of the fibers as well as the pigment and the soaps, detergents, or bleaching agents. We have found that the various ingredients of the waste liquor are either in solution or in a condition of colloidal suspension or dispersion and that this condition renders especially difficult the separation or segregation of the various ingredients and especially those which it is desired to recover. In general, our invention proposes to subject the waste liquor to the action of a flocculating agent which coagulates or coalesces the colloidal content of the liquor. The difference in the floatability of the ink pigment, carbon-black for example, and the fibrous material, is then utilized to effect separation of these ingredients, this being accomplished by flotation, that is, by agitating the mass while it is subject to the action of frothing agents and then raking or skimming off the froth and the pigment carried thereby to effect separation of the pigment from the fibers. Upon washing, a water suspension of the pigment is had.

Usually it is desirable to employ sulphuric acid as the flocculating agent and this is especially so where soaps have been used as the de-inking reagents as under such circumstances the acidification not only effects flocculation but releases the fatty acids which rise to the surface of the liquid on standing and are recovered by skimming. However, various other flocculating agents may be employed. The use of alum, chlorinated copperas, or any of the well known neutralizing and flocculating agents may be used and the choice of such an agent depends, of course, upon the characteristics of the effluent. Fish oil soap or cotton seed foots oil soap are employed as the frothing agents although any soaps or other agents satisfactory for the flotation operation contemplated may be employed.

The method of the present invention will be described in detail in connection with the treatment of the soapy effluents from the de-inking of old newspapers as described in the application of Sidney D. Wells for Apparatus for and method of treating and handling paper pulp and similar fibrous materials, filed January 9, 1933, Serial No. 650,935.

The effluent from the first screw press is treated with ten pounds of sulphuric acid per ton of effluent and, after mixing, it is delivered to settling tanks in such a manner that the entrainment of air is avoided. After standing five hours the oil released from the soaps used in de-inking are skimmed from the surface and the clear liquor, amounting to approximately one third of the total volume, is decanted off leaving the flocculated fiber and ink in the lower two thirds of the tank volume.

The liquor containing the flocculated fiber and ink is next conditioned for five minutes by treatment with two pounds of fish oil soap and one pound of cottonseed foots oil soap to each ton of liquor. It is next treated in a battery of mechanical flotation machines such as are known to those familiar with the art of the flotation of minerals. The rate of feed to the battery should be such that the flocculated fiber and ink are in the zone of active agitation and aeration for a total period of from twenty to twenty-five minutes although it is obvious that this period may be lengthened or shortened depending upon the types of paper stock and ink, de-inking reagents, water conditions, temperature, and any of the other factors which obviously affect an operation of this kind.

The froth from the flotation machines contains the pigment of the ink and is relatively free from fiber when the conditions are adjusted to the type of material to be handled. On treatment with showers of water the froth raked into the concentrated launder is broken and a water suspension of pigment results. The pigment can be further purified by washing and separated from the liquid by filtration.

The tails from the aeration and agitation flotation machines carry the pulp fibers relatively free from ink and may be used as part of the furnish for suitable grades of paper or may be again introduced with the old paper stock at the commencement of the de-inking process.

In the operation of the flotation step it must be remembered that in the colloidal condition separation is impossible. It is first necessasry to change from the colloidal to the non-colloidal condition and this calls for the flocculation of the suspended fiber, pigment, dispersing and detergent agents used in the de-inking process. In the particular application of the method just described, sulphuric acid has been mentioned. However, alum, chlorinated copperas or any of the well known neutralizing and flocculating agents may be used and choice will depend upon the characteristics of the effluent. After treatment with the flocculation agents thorough mixing should be provided followed by a settling period for the settling of the fiber and pigment and the rising of the oils, fats, waxes, resins, etc. which may occur.

After separation by skimming and decantation of the fractions free from fiber and pigment the latter fraction must be treated with frothing agents and collectors and given a proper mixing and time for conditioning. Any of the well known conditioning units common to the art may be used.

Flotation may be accomplished in flotation machines of the mechanical or air agitation types. The mechanical types are preferable in this work, however, on account of the more pronounced type of agitation. Nevertheless, it must be understood that the practice of the method is not limited to this type.

It is recognized that the use of flotation for the separation of the sulphide constituents of mine ores is relatively old and has been practiced in this country for over twenty years. This has been followed in more recent years by the flotation of certain nonsulphides such as graphite, phosphate rocks, etc. and still more recently to various nonsulphide rock forming constituents such as quartz, feldspar, mica, clay, etc. Attempts have also been made to remove ink from paper stock by the use of flotation as the major de-inking operation. These attempts have either failed to produce results or the results have been so unpromising that operations resulting from the attempts have long since been abandoned. It is the opinion of the applicants that the reason for these failures is the relatively enormous proportion of fiber to pigment in any process depending upon flotation as the major de-inking operation. In our opinion the success of our efforts results from the fact that we carried our de-inking as a separate operation and treated by flotation only a fraction of the fiber treated in the major operation. It was consequently possible to de-ink with relatively small volumes of water and at the same time have sufficient volume for the treatment of the fiber and pigment occurring in the effluent under optimum conditions for separation by flotation. It was also possible to combine the flocculation step with the recovery of any of the oils, fats, waxes, resins or gums which might occur in the paper or form a part of the de-inking chemicals used.

In the case of de-inking processes depending upon the use of alkalies with or without colloidal agents such as colloidal clays, silicic acid, hydroxides or aluminum or iron, gelatin, etc., the flocculation of the fibrous material will also serve to flocculate the colloidal agents and the flotation of the carbon black can be accomplished in the same manner as the flocculated soap liquors from which the fatty acids have been released. When colloidal clays and inorganic colloids are used the flocculated colloids remain in the tail liquor with the fibers and the ink is floated off in the froth. Many of the flocculated colloids are valuable as fillers and often it is not necessary to separate them from the recovered fiber.

Not only can carbon black be floated from fiber but also most pigments based upon metallic salts or metallic lakes of dyestuffs. Wastes from the carbonizing of woolen rags containing cotton or other vegetable fibers, wool scouring operations, etc. can be similarly treated with the resulting recovery of valuable by-products or the rendering less objectionable of water effluents from the standpoint of stream pollution. In addition to the instances cited above, waste liquors, from the purification of illuminating gas is an example of application to an industry not interested in fibrous material. In this industry the waste liquors contain sulphur in colloidal condition which heretofore have not been removed by filtration in any feasible manner. By flocculation and the use of frothing agents the sulphur can be economically floated off and recovered while at the same time the liquors are rendered less objectionable.

It is to be understood that considerable latitude in the choice of reagents and types of apparatus and in other respects may be resorted to in the practice of the method without departing from the spirit of the invention or the scope of the subjoined claims, as will be apparent to those skilled in the art.

The invention claimed is:

1. The hereindescribed method of recovering the pigment, fatty acids and retained fibers from the waste liquor of de-inking operations wherein soaps are used as the de-inking reagents, which method consists in subjecting the liquor to the action of sulphuric acid to flocculate the pigment and fiber and to release the fatty acids from the soap ingredients of the liquor, removing the released fatty acids from the liquor and then removing the pigment from the liquor by flotation.

2. The hereindescribed method of recovering the pigment and the retained fibers from the waste liquor of de-inking operations which consists in subjecting the liquor to the action of sulphuric acid to coalesce the pigment and fibers therein, agitating the liquor while subjecting it to the action of a frothing agent whereby the froth which forms and rises to the surface of the liquor attracts and holds the pigment, and then removing the froth with the pigment carried thereby from the liquor.

3. The hereindescribed method of recovering the pigment and the retained fibers from the waste liquor of de-inking operations which consists in subjecting the liquor to the action of sulphuric acid to coalesce the colloidal content of the liquor and release the fatty acids from the soapy content thereof, skimming off the fatty acids from the liquor, agitating the liquor in the presence of a frothing agent whereby the pigment is attracted to and held in the froth whereas the fibers remain in the tailings and then separating the froth carried pigment from the liquor and its fibers.

4. The hereindescribed method of recovering the pigment, fatty acids and retained fibers from the waste liquor of de-inking operations wherein soaps are used as the de-inking reagents, which method consists in subjecting the liquor to the action of sulphuric acid to flocculate the pigment and fiber and to release the fatty acids from the soap ingredients of the liquor, skimming off the fatty acids from the liquor, decanting a clear portion of the liquor, agitating the remainder of the liquor together with the flocculated pigment and fiber in the presence of fish oil soap and cotton seed foot oil soap whereby the pigment is attracted to and held by the froth which forms and rises to the surface of the liquor, raking off the froth together with the pigment carried thereby, and washing the froth from the pigment.

5. The hereindescribed method of recovering the pigment and the retained fibers from the waste liquor of de-inking operations which consists in subjecting the liquor to the action of a flocculating agent to coalesce the pigment and fibers and then agitating the liquor together with the flocculated pigment and fibers in the presence of fish oil soap and cotton seed foot oil soap whereby the pigment is attracted to and held by the froth which forms and rises to the surface of the liquor and then separating the froth carried pigment from the liquor and its fibers.

6. The hereindescribed method of recovering the pigment and the retained fibers from the waste liquor of de-inking operations which consists in subjecting the liquor to the action of a flocculating action to coalesce the pigment and fibers, then agitating the liquor together with the flocculated pigment and fibers in the presence of a froth producing agent whereby the pigment is attracted to and held by the froth which forms and rises to the surface of the liquor and then separating the froth carried pigment from the liquor and its fibers.

7. The hereindescribed method of recovering the pigment and the retained fibers from the waste liquor of de-inking operations wherein soaps are used as the de-inking reagents which consists in cracking the soluble soaps so as to release the fatty acids, removing the released fatty acids, coagulating the colloidal content of the remaining liquor and separating the pigment from such liquor by flotation.

8. The hereindescribed method of recovering the pigment and the retained fibers from the waste liquor of de-inking operations wherein soaps are used as the de-inking reagents which consists in cracking the soluble soaps so as to release the fatty acids, removing the released fatty acids, coagulating the colloidal content of the remaining liquor and agitating the remaining liquor while subjecting it to the action of a frothing agent whereby the pigment is attracted to and held by the froth which forms and rises therewith to the surface of the liquor, removing the froth together with the pigment carried thereby from the surface of the liquor, washing the froth from the pigment and then separating the fibers from the liquor that remains.

SIDNEY D. WELLS.
WILLIAM B. CRAMER.